Jan. 15, 1952  F. MEINIG  2,582,876
OPTICAL PROJECTING PRECISION BALANCE
Filed April 13, 1950
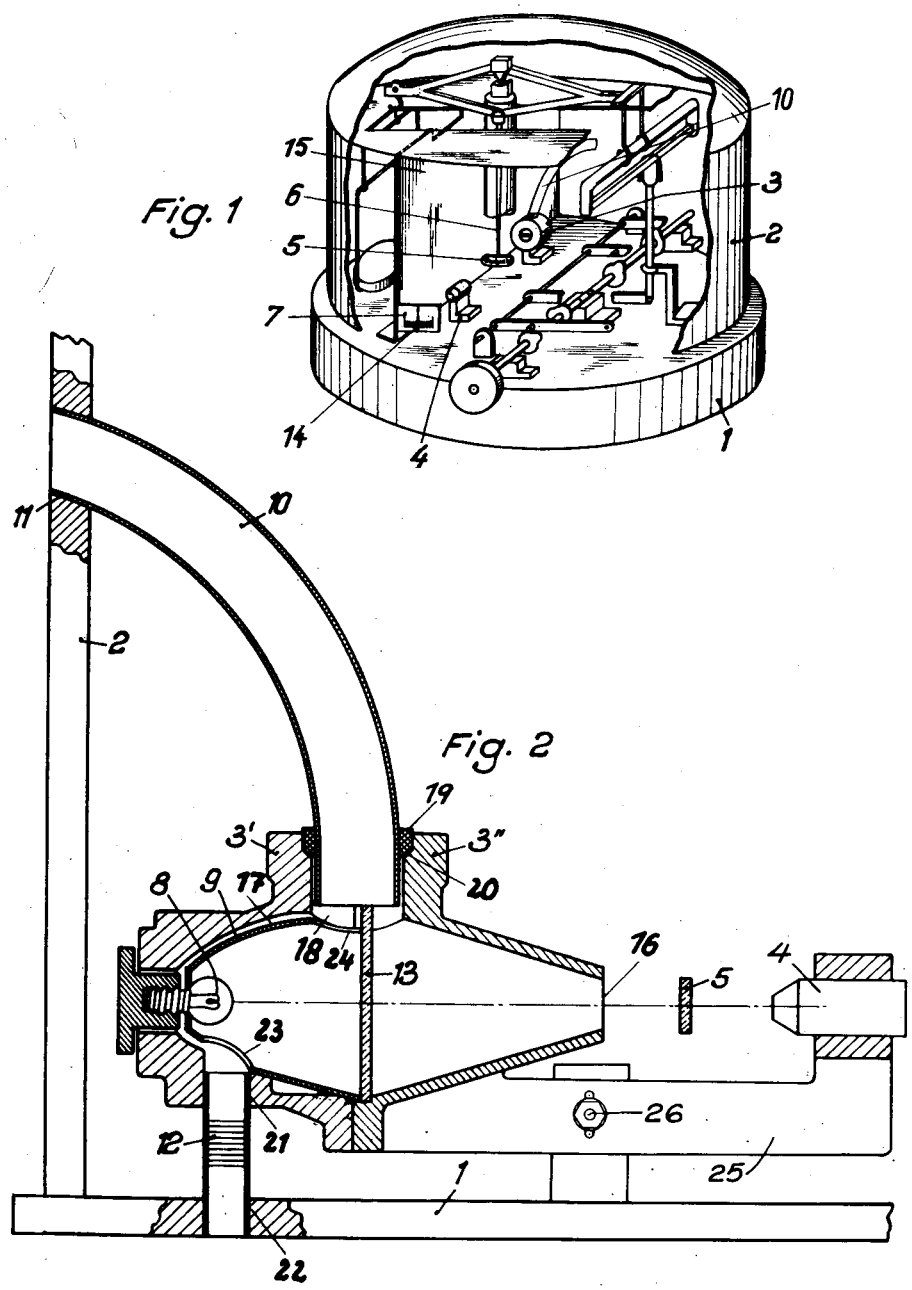
Inventor:

Patented Jan. 15, 1952

2,582,876

UNITED STATES PATENT OFFICE 2,582,876

OPTICAL PROJECTING PRECISION BALANCE

Friedrich Meinig, Goettingen, Germany

Application April 13, 1950, Serial No. 155,615
In Germany August 18, 1949

14 Claims. (Cl. 88—24)

The present invention relates to a balance, and more particularly to a precision balance in which the position of the pointer is projected on a scale by a beam of light.

It is an object of the present invention to combine the source of light with the balance whereas balances of the kind described known in the art have the source of light arranged outside the balance which has many disadvantages.

It is another object of the present invention to provide a balance of the kind described with means for withdrawing the heat generated by the source of light.

It is a further object of the present invention to arrange the illuminating device including the source of light and an objective on the base plate of the balance.

It is a still further object of the present invention to provide a balance of the type described with a removable cover.

A balance according to the present invention comprises a cover, and an illuminating device arranged inside the cover and including a light source and a casing enclosing the source, the casing having an aperture for the exit of the beams of rays emitted by the source. Preferably means for withdrawing heat from the casing are combined with the latter.

In a preferred embodiment of the present invention a cold light source or one having a negligible heat output in comparison to the light output thereof is provided.

According to a preferred embodiment of the invention the balance comprises a cover, an illuminating device arranged inside the cover and including a reflector, a light source arranged in the reflector, and a casing enclosing the reflector and the source, and a reading scale, the reflector being arranged for throwing light rays emitted by the source directly on the reading scale. Preferably the casing and the reflector define a heat insulating air gap between each other.

In a preferred embodiment of the present invention an exit pipe is connected to the casing for withdrawing air heated by the source from the casing, the exit pipe extending through the cover to the atmosphere. Also an inlet pipe for fresh air is connected to the casing which extends through the base plate to the atmosphere.

In a preferred embodiment of the present invention a heat filter is arranged in front of the reflector between the light source and the reading scale.

According to an embodiment of the invention a member is mounted on the base plate and carries the illuminating device. Preferably the member is adjustable substantially parallel to the direction of the pointer.

In a preferred embodiment of the present invention a matted glass plate is rigidly connected to the base plate and arranged substantially in alignment with the illuminating device, the balance pointer, the reading scale, and the objective.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a perspective view of a balance according to the invention, the cover and some parts in the interior being partly broken away in order to show diagrammatically the relative position of the parts; and Fig. 2 is a sectional elevation of the light source and the associated parts shown in Figure 1 at an enlarged scale.

Referring now to the drawings the balance comprises a substantially cylindrical base plate 1 provided with a removable cover 2. Inside the cover 2 all the mechanisms for the weighing are secured to the base plate 1. The weighing mechanism proper which does not form part of the present invention is diagrammatically shown in Figure 1 but it is not designated by any reference numerals.

On the base plate 1 are mounted an illuminating device 3 and an objective 4 which may be if desired connected to the base plate 1 by means of a separate member 25. Between the illuminating device 3 and the objective 4 is arranged the reading scale 5 which is rigidly connected to the tip of the pointer 6 of the balance and moved together with the latter. An image of the reading scale 5 is thrown by the objective 4 on a matted glass plate 7 secured to the base plate 1 by means of the partition 15 and carrying a mark 14.

The illuminating device 3 is shown in Fig. 2 at an enlarged scale. The illuminating device comprises an outer casing 3', 3'', in the part 3 of which the light source such as a bulb 8 is arranged which produces no heat at all or very little heat. The bulb 8 may be designed, if desired, as a cold source of light such as an electric discharge tube. However, bulbs having a small heat production can be used since the casing 3', 3", which contains the bulb is provided with means for withdrawing hot air and means for letting in fresh air.

The embodiment showing the casing consists of two parts, 3' and 3", the part 3' carrying the bulb 8 and the part 3" being conically shaped and having an aperture 16 for the exit of the light rays emitted by the bulb 8. The part 3' is provided with a reflector 9 enclosing the glass envelope of the bulb 8 and collecting the rays of light and throwing them through the aperture 16 on the reading scale 5. The reflector 9 and the part 3' of the casing define an air gap 17 serving as a heat insulating means. At the top of the casing is a relatively large aperture 18 surrounding the lower end of a pipe 10 for the withdrawal of hot air from the casing. The pipe 10 is led through a packing 19 or the like provided in a shoulder 20 of the upper part of the aperture 18. The pipe 10 is curved and leads through an aperture 11 in the wall of the cover 2 to the atmosphere.

The part 3' is provided in the bottom part thereof with an aperture 21 through which the interior of the casing is connected to a pipe 12 which leads through an aperture 22 of the base plate 1 to the atmosphere. The reflector 9 is provided with an aperture 23 above the pipe 12 and an aperture 24 underneath the pipe 10.

A heat filter 13 designed as a glass plate impermeable for heat is provided at the front of the reflector 9 between the bulb 8 and the reading scale 5.

The operation of this device is as follows:

Lights of rays are thrown by the reflector 9 on the reading scale 5, an image of which is projected by the objective 4 on the matted glass plate 7 provided with the mark 14. Any heat produced inside the casing 3', 3" is withdrawn by the pipe 10 and led to the atmosphere. Through the pipe 12 fresh air is continually supplied to the casing 3', 3" so that no heat will reach the weighing mechanism proper and exert any damaging influence on it.

If a separate carrier member 25 is provided for the illuminating device 3 and the objective 4 as mentioned hereabove, this member 25 can be adjustable in the vertical direction, by means of a bolt passing through a slot of member 25, as shown in Fig. 2. This direction substantially parallel to the pointer 6 of the balance so that the illuminating device 3 and the objective 4 can be adjusted to the length of the pointer 6.

It will be understood that each of the elements described above, or two or more together, may also find a useful application in other types of balances differing from the types described above.

While I have illustrated and described the invention as embodied in a precision balance in which the position of the pointer is projected on a scale by a beam of light, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features, that, from the standpoint of prior art, fairly constitute essential characteristics of the generic or specific aspects of this invention and, therefore, such adaptations should and are intended to be comprehended within the meaning and range of equivalence of the following claims.

I claim:

1. A precision balance comprising in combination, a base plate; a cover arranged on said base plate; an illuminating device arranged inside said cover and including a reflector, a light source arranged in said reflector, and a casing enclosing said reflector and said source, said casing having an aperture for the exit of the beams of rays emitted by said source; a member mounted on said base plate and carrying said illuminating device; a reading scale, said reflector being arranged for throwing light rays emitted by said source directly on said reading scale; a balance pointer arranged between said illuminating device and said reading scale, the tip of said pointer being rigidly connected to said reading scale; means for adjusting said member substantially parallel to the direction of said pointer; a matted glass-plate rigidly connected to said base plate; an objective supported by said member, said illuminating device, said balance pointer, said reading scale, said objective, and said matted glass-plate being arranged substantially in alignment in the order named; a heat filter arranged in front of said reflector between said light source and said reading scale; an exit pipe connected to said casing for withdrawing air heated by said source from said casing, said exit pipe extending through said cover to the atmosphere; and an inlet pipe for fresh air connected to said casing and extending through said base plate to the atmosphere.

2. A precision balance comprising in combination, a base plate; a cover arranged above said base plate; an illuminating device arranged inside said cover and including a reflector, a light source arranged in said reflector, and a casing enclosing said reflector and said source, said casing having an aperture for the exit of the beams of rays emitted by said source; a member mounted on said base plate and carrying said illuminating device; a reading scale, said reflector being arranged for throwing light rays emitted by said source directly on said reading scale; a balance pointer arranged between said illuminating device and said reading scale; a matted plate rigidly connected to said base plate; an objective between the reading scale and the matted plate, said illuminating device, said balance pointer, said reading scale, said objective, and said matted plate being arranged substantially in alignment in the order named.

3. In a precision balance according to claim 2, the tip of the said pointer being rigidly connected to said reading scale.

4. In a precision balance according to claim 2, means for adjusting the said member carrying the said illuminating device substantially parallel to the direction of the said pointer.

5. In a precision balance according to claim 2, heat filter arranged in front of the said reflector between said light source and said reading scale.

6. In a precision balance according to claim 2, an exit pipe connected to said casing for withdrawing air heated by said source from said casing, said exit pipe extending through said cover to the atmosphere.

7. In a precision balance according to claim 2, an exit pipe connected to said casing for withdrawing air heated by said source from said casing, said exit pipe extending through said cover to the atmosphere, and an inlet pipe for fresh air connected to said casing and extending through said base plate to the atmosphere.

8. A precision balance comprising in combination, a base plate; a cover arranged on said base plate; an illuminating device arranged inside said cover and including a reflector, a light source arranged in said reflector, and a casing enclosing said reflector and said source, said casing having an aperture for the exit of the beams of rays emitted by said source; a member mounted on said base plate and carrying said illuminating device; a reading scale, said reflector being arranged for throwing light rays emitted by said light source directly on said reading scale; a balance pointer arranged between said illuminating device and said reading scale, the tip of said pointer being rigidly connected to said reading scale; means for adjusting said member substantially parallel to the direction of said pointer; a matted plate rigidly connected to said base plate; an objective supported by said member, said illuminating device, said balance pointer, said reading scale, and objective, and said matted plate being arranged substantially in alignment in the order named; a heat filter arranged in front of said reflector between said light source and said reading scale; an exit pipe connected to said casing for withdrawing air heated by said source from said casing, said exit pipe extending through said cover to the atmosphere; and an inlet pipe for fresh air connected to said casing and extending through said base plate to the atmosphere.

9. A precision balance, comprising in combination, a base plate having a substantially flat top surface; an illuminating device mounted on said top surface of said base plate; a reading scale mounted above said base plate ahead of said illuminating device so that the light rays emanating from said illuminating device are directed to said reading scale; a balance pointer located between said illuminating device and reading scale; a translucent plate mounted on said base plate ahead of said reading scale; and an objective mounted on said base plate between said reading scale and said translucent plate, said illuminating device, reading scale, balance pointer, translucent plate, and objective all being mounted along a single straight line substantially parallel to the path along which the light rays emanating from said light source travel, and said single straight line being substantially parallel to said top surface of said base plate, whereby the position of said balance pointer may be indicated on said translucent plate.

10. A precision balance, comprising in combination, a base plate having a substantially flat top surface; an illuminating device mounted on said top surface of said base plate; a reading scale mounted above said base plate ahead of said illuminating device so that the light rays emanating from said illuminating device are directed to said reading scale; a balance pointer located between said illuminating device and reading scale; a translucent plate mounted on said base plate ahead of said reading scale; an objective mounted on said base plate between said reading scale and said translucent plate, said illuminating device, reading scale, balance pointer, translucent plate, and objective all being mounted along a single straight line substantially parallel to the path along which the light rays emanating from said light source travel, and said single straight line being substantially parallel to said top surface of said base plate, whereby the position of said balance pointer may be indicated on said translucent plate; and cooling means operatively connected to said illuminating device for cooling the same.

11. A precision balance, comprising in combination, a base plate having a substantially flat top surface; an illuminating device mounted on said top surface of said base plate; a reading scale mounted above said base plate ahead of said illuminating device so that the light rays emanating from said illuminating device are directed to said reading scale; a balance pointer located between said illuminating device and reading scale; a translucent plate mounted on said base plate ahead of said reading scale; an objective mounted on said base plate between said reading scale and said translucent plate, said illuminating device, reading scale, balance pointer, translucent plate, and objective all being mounted along a single straight line substantially parallel to the path along which the light rays emanating from said light source travel, and said single straight line being substantially parallel to said top surface of said base plate, whereby the position of said balance pointer may be indicated on said translucent plate; cooling means operatively connected to said illuminating device for cooling the same; and a cover member resting on said base plate and enclosing all of said above-mentioned elements.

12. A precision balance, comprising in combination, a base plate having a substantially flat top surface; an illuminating device mounted on said top surface of said base plate; a reading scale mounted above said base plate ahead of said illuminating device so that the light rays emanating from said illuminating device are directed to said reading scale; a balance pointer located between said illuminating device and reading scale; a translucent plate mounted on said base plate ahead of said reading scale; an objective mounted on said base plate between said reading scale and said translucent plate, said illuminating device, reading scale, balance pointer, translucent plate, and objective all being mounted along a single straight line substantially parallel to the path along which the light rays emanating from said light source travel, and said single straight line being substantially parallel to said top surface of said base plate, whereby the position of said balance pointer may be indicated on said translucent plate; cooling means operatively connected to said illuminating device for cooling the same, said cooling means comprising a first duct communicating with the interior of said illuminating device and passing through said cover member to the atmosphere and a second duct communicating with the interior of said illuminating means and passing through said base plate to the atmosphere; and a cover member resting on said base plate and enclosing all of said above-mentioned elements.

13. A precision balance, comprising in combination, a base plate having a substantially flat top surface; an illuminating device mounted on said top surface of said base plate; a reading scale mounted above said base plate ahead of said illuminating device so that the light rays emanating from said illuminating device are directed to said reading scale; a balance pointer located between said illuminating device and reading scale and having its tip fixedly connected to said reading scale; a translucent plate mounted on said base plate ahead of said reading scale; and an objective mounted on said base plate between said reading scale and said translucent plate, said illuminating device, reading scale, balance pointer, translucent plate, and objective all being mounted along a single straight line substantially parallel to the path along which the light rays emanating from said light source travel, and said single straight line being substantially parallel to said top surface of said base plate, whereby the position of said balance pointer may be indicated on said translucent plate.

14. A prevision balance, comprising in combination, a base plate having a substantially flat top surface; an illuminating device mounted on said top surface of said base plate; a reading scale mounted above said base plate ahead of said illuminating device so that the light rays emanating from said illuminating device are directed to said reading scale; a balance pointer located between said illuminating device and reading scale and having its tip fixedly connected to said reading scale; a translucent plate mounted on said base plate ahead of said reading scale; an objective mounted on said base plate between said reading scale and said translucent plate, said illuminating device, reading scale, balance pointer, translucent plate, and objective all being mounted along a single straight line substantially parallel to the path along which the light rays emanating from said light source travel, and said single straight line being substantially parallel to said top surface of said base plate, whereby the position of said balance pointer may be indicated on said translucent plate; cooling means operatively connected to said illuminating device for cooling the same, said cooling means comprising a first duct communicating with the interior of said illuminating device and passing through said cover member to the atmosphere and a second duct communicating with the interior of said illuminating means and passing through said base plate to the atmosphere; and a cover member resting on said base plate and enclosing all of said above-mentioned elements.

FRIEDRICH MEINIG.

REFERENCES CITED

The following references are of record in the file of this patent:

UNITED STATES PATENTS

| Number | Name | Date |
|---|---|---|
| 1,207,291 | Harrington | Dec. 5, 1916 |
| 1,357,731 | Schaper | Nov. 2, 1920 |
| 1,562,936 | Ainsworth | Nov. 24, 1925 |
| 2,160,847 | Eitzen | June 6, 1939 |
| 2,388,912 | Haferl et al. | Nov. 13, 1945 |
| 2,417,392 | Craig et al. | Mar. 11, 1947 |
| 2,456,711 | Knutson et al. | Dec. 21, 1948 |

FOREIGN PATENTS

| Number | Country | Date |
|---|---|---|
| 510,003 | Germany | Oct. 15, 1930 |